United States Patent [19]

Chou et al.

[11] Patent Number: 5,606,644
[45] Date of Patent: Feb. 25, 1997

[54] MINIMUM ERROR RATE TRAINING OF COMBINED STRING MODELS

[75] Inventors: Wu Chou, Berkeley Heights; Biing-Hwang Juang, Warren; Chin-Hui Lee, New Providence, all of N.J.

[73] Assignee: Lucent Technologies Inc., Murray Hill, N.J.

[21] Appl. No.: 638,408

[22] Filed: Apr. 26, 1996

Related U.S. Application Data

[63] Continuation of Ser. No. 96,142, Jul. 22, 1993, abandoned.

[51] Int. Cl.$^6$ .................................. G10L 5/06; G10L 9/00
[52] U.S. Cl. ........................ 395/2.52; 395/2.53; 395/2.54
[58] Field of Search ................................... 395/2.52, 2.53, 395/2.54, 2.55, 2.64, 2.65, 2.66

[56] References Cited

U.S. PATENT DOCUMENTS

| | | | |
|---|---|---|---|
| 4,783,804 | 11/1988 | Juang et al. | 381/43 |
| 4,882,759 | 11/1989 | Bahl et al. | 381/51 |
| 5,222,146 | 6/1993 | Bahl et al. | 381/41 |
| 5,280,563 | 1/1994 | Ganong | 395/2 |
| 5,293,451 | 3/1994 | Brown et al. | 395/2.54 |

OTHER PUBLICATIONS

L. R. Bahl et al., "A New Algorithm for the Estimation of Hidden Markov Model Parameters," *Proc. ICASSP88*, 493–496 (1988).

S. Katagiri et al., "New Discriminative Algorithms Based on the Generalized Probabilistic Descent Method," *Proc. IEEE–SP Workshop on Neural Network for Signal Processing*, 299–308 (1991).

W. Chou et al., "Segmental GPD Training of an Hidden Markov Model Based Speech Recognizer," *Proc. ICASSP92*, 473–476 (1992).

W. Chou et al., "Minimum Error Rate Training Based on N–Best String Models," *Proc. ICASSP93*, 652–655 (1993).

R. Schwartz et al., "New Uses for the N–Best Sentence Hypotheses Within the Byblos Speech Recognition System," *Proc. ICASSP92*, 1–4 (1992).

F. K. Soong et al., "A Tree-Trellis Based Fast Search for Finding the N–Best Sentence Hypotheses in Continuous Speech Recognition," *Proc. ICASSP91*, 705–708 (1991).

Rowden, Chris; "Speech Processing", 1992, pp. 208–209, 234–241, 266–267.

*Primary Examiner*—Allen R. MacDonald
*Assistant Examiner*—Indranil Chowdhury
*Attorney, Agent, or Firm*—Thomas A. Restaino; Kenneth M. Brown

[57] ABSTRACT

A method of making a speech recognition model database is disclosed. The database is formed based on a training string utterance signal and a plurality of sets of current speech recognition models. The sets of current speech recognition models may include acoustic models, language models, and other knowledge sources. In accordance with an illustrative embodiment of the invention, a set of confusable string models is generated, each confusable string model comprising speech recognition models from two or more sets of speech recognition models (such as acoustic and language models). A first scoring signal is generated based on the training string utterance signal and a string model for that utterance, wherein the string model for the utterance comprises speech recognition models from two or more sets of speech recognition models. One or more second scoring signals are also generated, wherein a second scoring signal is based on the training string utterance signal and a confusable string model. A misrecognition signal is generated based on the first scoring signal and the one or more second scoring signals. Current speech recognition models are modified, based on the misrecognition signal to increase the probability that a correct string model will have a rank order higher than other confusable string models.

21 Claims, 3 Drawing Sheets

MINIMUM ERROR RATE TRAINING OF COMBINED STRING MODELS

This application is a continuation of application Ser. No. 08/096,142, filed on Jul. 22, 1993, now abandoned.

FIELD OF THE INVENTION

The present invention relates generally to the training of pattern databases and, more specifically, to the training of speech pattern databases for speech processing tasks, such as speech recognition.

BACKGROUND OF THE INVENTION

The objective of continuous speech recognition is to identify (i.e., recognize) an underlying word sequence from an input speech utterance. Recognition is performed with use of a set of speech recognition patterns or models (hereinafter, models). These basic speech recognition models are the building blocks for words and strings of words, such as phrases or sentences. Recently, significant research effort has been concentrated on the problem of how to select and represent these basic speech recognition units for use in continuous speech recognition.

One conventional approach to the continuous speech recognition problem is that of statistical pattern recognition using acoustic recognition models, such as templates or hidden Markov models (HMMs). Based on a lexical description of a vocabulary, acoustic speech recognition models are prescribed and their parameters are then statistically determined through a process known as training. The basic models may reflect vocabulary words or subwords (such as phones that are the acoustic manifestation of linguistically-based phonemes). One assumption generally made in this approach to continuous speech recognition is that a fluently spoken sequence of words, i.e. a word string, may be adequately represented by a linear concatenation of the basic speech recognition models (of words or subwords) according to the lexical transcription of the words in the string. Conventionally, this has meant a concatenation of speech recognition models estimated directly from training tokens (such as words). A concatenation of acoustic recognition models forms a model of the word string and is a type of word string model. In continuous speech recognition, multiple string models are hypothesized for a given recognition task. Each such string model is compared with a continuous utterance to be recognized. The closeness of each comparison is indicated by a recognition score. The string model which most closely compares with the continuous utterance "recognizes" the utterance.

Another conventional approach to continuous speech recognition is to augment word string models with non-acoustic recognition models. These non-acoustic recognition models include, inter alia, language models, phonetic-based models, semantic models, syntactic models, and other knowledge sources (e.g., pitch, energy, speaking rate, duration, etc.). In such an approach, a word string may be modeled as a combination of acoustic models, language models, etc. Recognition scores from individual models are incorporated into an overall string model recognition score. The incorporation of scores into a string model recognition score is accomplished by, for example, a weighted sum of individual recognition scores from individual string models.

Conventionally, the training of individual recognition models is performed on an individualized basis. In acoustic model training, for example, training speech is segmented into individual word or subword training tokens. Individual acoustic models are therefore trained with training tokens which have been isolated from a longer training utterance. Moreover, acoustic and other models are trained individually, while the parameters used to combine such models for purposes of recognition may be selected hueristically, separate and apart from the training of other models.

All of this individualized training belies the fact that such models will be used together for purposes of continuous speech recognition. That is, continuous speech recognition is predicated on how well a combination of models (i.e., a string model) compares with an entire unknown string. One combination of models will be selected over another based on how well each string model compares to the unknown string in the aggregate. This aggregate comparison may be referred to as a global score of the combination. Thus, should a continuous speech recognizer make an error, it does so based on comparisons made at a global or string level, not at the individualized levels at which models or other information sources have been trained. Because of the level "discrepancy" between training and recognition philosophy, continuous speech recognition performance may be less than desired.

SUMMARY OF THE INVENTION

The present invention provides a technique suitable for training speech recognition models (including acoustic models, language models, and other knowledge sources) at a global string level so as to reduce, e.g., minimize, word string recognition error rate. The invention applies discriminative analysis to string level model matching.

According to an illustrative embodiment of the invention, a set of confusable string models is generated based on a single lexical string from a training database. Each string model comprises a combination of acoustic and language models. Given a training string token from the training database, acoustic, language and combining model parameters are estimated so as to enhance the probability that the lexical string model will exhibit the best recognition score among the set of confusable string models. In this way, string recognition error rate is reduced.

Parameter estimation providing minimized string recognition error rate is obtained with the use of a specially designed loss function. This loss function accommodates string level allophonic variations in speech recognition unit models by taking into account the competing string models. By establishing a relationship between competing string model scoring differential and expected string recognition error, the minimization of expected error may be directly related to the maximization of the probability of having correct score rank order between the lexical string model and other confusable string models.

DETAILED DESCRIPTION

A. Illustrative Embodiment Hardware

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIGS. 1, 2, or 3 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

B. An Illustrative Embodiment

Speech recognition is a process by which an unknown speech utterance (usually in the form of a digital PCM signal) is identified. Generally, speech recognition is performed by comparing the features of an unknown utterance to the features of known words or word strings.

To recognize an unknown utterance, a speech recognizer extracts features from the utterance to characterize it. The features of the unknown utterance are referred to as a test pattern. The recognizer then compares combinations of one or more reference patterns in the database to the test pattern of the unknown utterance. A scoring technique is used to provide a relative measure of how well each combination of reference patterns matches the test pattern. The unknown utterance is recognized as the words associated with the combination of one or more reference patterns which most closely matches the unknown utterance.

Figure 1:
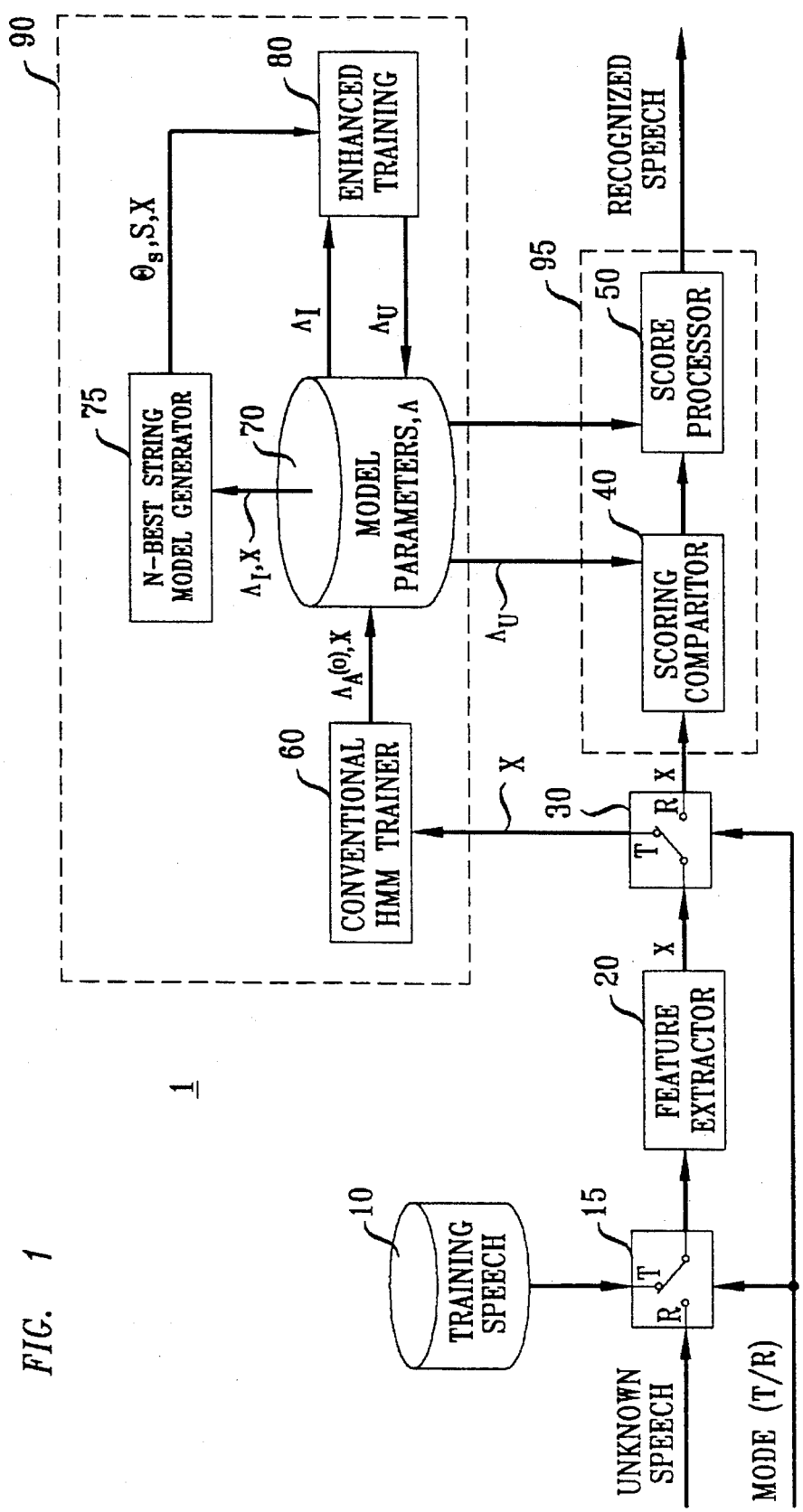
FIG. 1 presents an illustrative speech recognition system according to the present invention.

FIG. 1 presents an illustrative speech recognition system 1 according to the present invention. The system includes a training speech database 10, a feature extractor 20, mode switches 15,30, a scoring comparator 40, score processor 50, conventional HMM trainer 60, recognition model parameter database 70, N-best string model generator 75, and an enhanced trainer 80.

The training speech database 10 of system 1 comprises samples of known speech signals in digital form. Each speech signal corresponds to a string of one or more spoken words. These samples are used for the purposes of the conventional and enhanced trainers 60,80, respectively. Samples of known speech strings from database 10 are provided to other components of the system 1 via mode switch 15.

Mode switch 15 reflects two operational modes of system 1: a training (T) mode and a recognition (R) mode. When switch 15 is in the T position (or state), training speech from database 10 may be provided to the balance of the system 1 such that training may be performed by training section 90. When switch 15 is in the R position, unknown speech utterances (signals) in digital form are provided to the balance system 1 for recognition by recognition section 95.

The feature extractor 20 of system 1 is coupled to mode switch 15. Depending on the state of mode switch 15, extractor 20 will receive either training or unknown speech signal strings. Based on these received speech signals, extractor 20 produces one or more feature vectors, X, characterizing the received speech. Feature extractor 20 may be any of the conventional feature extractors, such as, e.g., a filter bank feature extractor, a linear predictive coding (LPC) feature extractor, or a discrete Fourier transform (DFT) feature extractor.

Feature vectors output from extractor 20 are provided to a second mode switch 30. This mode switch 30 operates in tandem with mode switch 15. That is, both switches are set to the same state—T or R—at the same time based upon a mode signal provided to both switches 15,30. Mode switch 30 directs the output of the extractor 20 to either the recognition or training section of system 1.

The recognition section 95 of system 1 comprises a scoring comparator 40 and a score processor 50. Scoring comparator 40 is conventional. Comparator 40 relates a string model to an unknown speech signal string and determines a score indicating the closeness of the comparison. The string models comprise, for example, a combination of acoustic string models and language string models. Conventional scoring comparators for acoustic and language models may be used for comparator 40. See, for example, Lee and Rabiner, *A Frame Synchronous Network Search Algorithm for Connected Word Recognition*, Vol. 37, No. 4, IEEE Trans. Acoust., Speech, and Sig. Pro., 1649–58 (1989) which is hereby incorporated by reference as if fully set forth herein. See also, for example, U.S. Pat. No. 4,783,804, entitled "Hidden Markov Model Speech Recognition Arrangement", which is commonly assigned with the present application and incorporated by reference as if fully set forth herein. Scores produced by comparator 40 are provided to the score processor 50. Score processor 50 determines which of the provided scores is greatest and identifies the string of words responsible for that score. The unknown speech signal string is recognized by processor 50 as the known speech associated with the identified string model. Processor 50 obtains representations of identified speech for output from model parameter database 70 (see below).

The training section 90 of system 1 comprises a conventional HMM trainer 60, a model parameter database 70, an N-best string model generator 75, and an enhanced trainer 80. HMM trainer 60, such as, e.g., that described by U.S. Pat. No. 4,783,804, provides conventional training of acoustic HMMs.

Model parameter database 70 stores a collection, $\Lambda = \{\Lambda_1, \ldots, \Lambda_m\}$, of m sets of recognition models, whether acoustic, language based, etc. Such recognition models may include pitch models, energy models, speaking rate models, and duration models. In the illustrative embodiment of the invention, $\Lambda = \{\Lambda_A, \Lambda_L, \Lambda_C\}$, where $\Lambda_A$ is a set of acoustic models, $\Lambda_L$ is a set of language models and $\Lambda_C$ is a combining model ($\Lambda_C$ comprises a set of parameters used in combining $\Lambda_A$ and $\Lambda_L$ for purposes of forming a global string model).

The output of trainer 60 comprises a set of one or more conventionally trained acoustic HMMs, $\Lambda_A$, as well as the feature vectors, X, of training speech strings on which the set of HMMs are based. For purposes of the illustrative embodiment of the present invention, the degree of training provided by conventional trainer 60 is unimportant. In fact, conventional trainer 60 need do no more than provide an initial set of HMM parameters, $\Lambda_I$ (even if trivial), which may be retrieved from read-only memory.

The output of trainer 60, $\Lambda_A$ (0), is recorded in model database 70 for use by generator 75 and enhanced trainer 80 as initialization parameters. Enhanced trainer 80 receives $\Lambda$ and X from database 70 and returns to database 70 a set of enhanced or updated HMMs, $\Lambda_U$. Ultimately, enhanced models, $\Lambda_U$, are provided to scoring comparator 40 during recognition mode. The scoring comparator's 40 use of enhanced models, $\Lambda_U$, provides for a reduced string recognition error rate.

N-best string model generator 75 receives models $\Lambda$ and training speech strings X and generates a set of string models which are highly competitive with the lexical string model. These competitive string models provide a basis for discriminative training of enhanced trainer 80.

Generator 75 generates the N-best (or most confusable) string models by determining the N-best (confusable) word strings and, for each such word string, the corresponding string models. Determination of the N-best word strings is made through use of a modified Viterbi decoder of the type described by F. K. Soong and E. F. Huang, *A tree-trellis based fast search for finding N-best sentence hypotheses in continuous speech recognition*, Proc. ICASSP (1991) which is incorporated by reference as if fully set forth herein. This decoder prepares a partial path map, i.e., a list of all scores (or metrics) of all partial paths leading to any grammar node (i.e., word juncture) at every time instant. At the grammar nodes, a unigram-type language model score may be added to the path score. For example, a log of a unigram probability for a given word may be added to a path score when the path reaches the end state of the given word. At the end of the modified Viterbi forward search, the decoder employs an A* traceback tree-search procedure. Generator 75 performs the tree-search by growing the top (best) partial path which is at the top of a "stack" (a rank ordered data list). The rank ordering of all partial paths on the stack is determined by the best possible score that a partial path can achieve when completed. The partial path map prepared in the forward Viterbi search provides a score for any incomplete partial path in the backward tree search. Due to the "best first" nature of the A* procedure, the top N-strings are generated sequentially.

The admissibility of the A* algorithm, or sure findings of the optimal path(s), is guaranteed when an upper bound of the incomplete portion of a partial path is used in the stack decoder, given the stack depth is deep enough to avoid any search errors. In the tree-trellis algorithm, the tightest upper bound or the actual score of the path is obtained if the same HMMs and language models are used in the searches along both directions. As a result, the search efficiency of the algorithm is maximized and a stack of N entries is needed.

Generator 75 generates N-best string models based on the N-best word strings by a Viterbi alignment of the input speech string, X, against the model sets for each given word string in the N-best string list. This step is performed by generator 75 because there may be many string models corresponding to the same word string; but the string model that best matches the input utterance for a given model set is unique.

It should be noted that generator 75 provides a capability of modeling unseen competitive strings. This is due to the fact that competing word strings generated through N-best decoding are not limited by the training material. While a training utterance corresponds to a single word string, the N-best string list associated with the utterance is dynamic and reflects the string level model resolution based on the given speech recognition unit model set. The basic recognition unit models are, therefore, trained by word strings generated by an N-best string model generator. These word strings include word strings not present in the original training material but whose string models the recognizer finds confusable with the string model of the lexical string. Unseen word strings which the recognizer finds confusing with the lexical word string are modeled discriminatively. Therefore, the modeling coverage for the unseen strings can be improved. Modeling unseen strings can be useful because such modeling reduces difficulties encountered in continuous speech recognition due to poor string coverage of the training material.

The operation of generator 75 described above may be summarized as follows. Let $S=W_1, \ldots, W_L$ be an arbitrary word string. Given the model set $\Lambda$ including acoustic models, language and other knowledge sources, the optimal state sequence $\Theta_S$ is a function of the observation X and the word string S. The N best string hypothesis $\{S_1, \ldots, S_N\}$ can be defined inductively as follows, $$S_1 = \underset{S}{\operatorname{argmax}} \ \log f(X, \Theta_S, S|\Lambda),$$

$$= \underset{S}{\operatorname{argmax}} \ \log f(X, \Theta_S, S|\Lambda) + \log f(S|\Lambda)$$

$$S_k = \underset{S \neq S_1, \ldots, S_{k-1}}{\operatorname{argmax}} \ \log f(X, \Theta_S, S|\Lambda)$$

$$= \underset{S \neq S_1, \ldots, S_{k-1}}{\operatorname{argmax}} \ \log f(X, \Theta_S, S|\Lambda) + \log f(S|\Lambda) + \log f(S|\Lambda),$$

where $\log f(X, \Theta_S, S|\Lambda)$ represents acoustic model scoring and $\log f(S|\Lambda)$ represents language model and other knowledge source scoring. In minimum string error rate training, these string level acoustic training tokens are incorporated into a set of discriminant functions specially designed for representing string errors. This is done by operation of the enhanced trainer 80, as described below.

Figure 2:
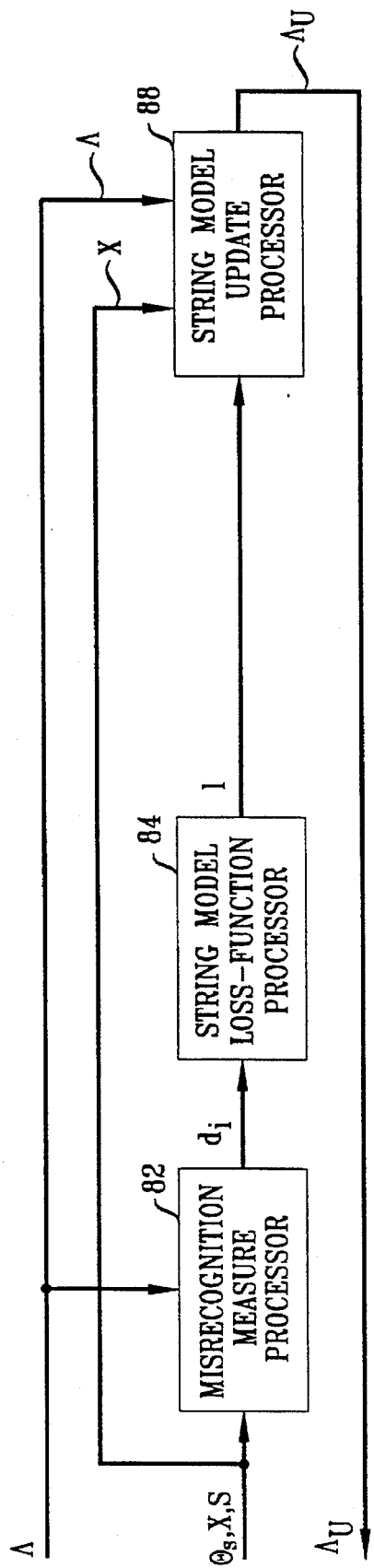
FIG. 2 presents an illustrative embodiment of an enhanced trainer appearing in FIG. 1.

FIG. 2 presents an illustrative embodiment of the enhanced trainer 80 appearing in FIG. 1. Enhanced trainer 80 operates on training speech provided by database 70. As a result of enhanced trainer 80 operation, an updated set of recognition models, $\Lambda_U$, is returned to the database 70. $\Lambda_U$ may then be used subsequently during recognition mode as a set of recognizer 1 reference patterns, or as a new $\Lambda$ to be updated further as a result of processing the same or additional training speech.

For purposes of explanation clarity and computational simplicity, the update processor 88 is illustratively described as processing one training string at a time. With a slight modification to be described below (see Discussion section), the embodiment can update $\Lambda$ based on several training speech samples.

Referring to FIG. 2, enhanced trainer 80 comprises a string misrecognition measure processor 82, a string model loss function processor 84, and a string model update processor 88.

1. String Misrecognition Measure Processor

String misrecognition measure processor 82 receives models, $\Lambda$, and a training speech string sample, X, from database 70. Based on string sample, X, and $\Lambda$, processor 82 determines a string misrecognition measure, $d(X, \Lambda)$:

$$d(X,\Lambda) = -g(X, S_{lex}, \Lambda_1, \ldots, \Lambda_m) + \log \left[ \frac{1}{N-1} \underset{S_k \neq S_{lex}}{\Sigma} e^{g(X, S_k, \Lambda_1, \ldots, \Lambda_m)\eta} \right]^{\frac{1}{\eta}} \quad (8)$$

where $g(X, S_{lex}, \Lambda_1, \ldots, \Lambda_m)$ is a recognizer score of the input utterance X given $S_{lex}$ as the correct string; $g(X, S_k, \Lambda_1, \ldots, \Lambda_m)$ is a recognizer score for each competitive string; $\eta$ is a positive number illustratively set to 2; and N is the total number of competing strings provided by generator 75. Illustratively, g may take the form of a weighted sum of recognizer scores:

$$g(X, S, \Lambda_1, \ldots, \Lambda_m) = \alpha_1 g_1(X, S, \Lambda_1) + \alpha_2 g_2(X, S, \Lambda_2) + \ldots + \alpha_m g_m(X, S, \Lambda_m), \quad (9)$$

or, in the case of the embodiment, $$g(X, S, \Lambda_A, \Lambda_L, \Lambda_C) = \alpha_A g_A(X, S, \Lambda_A) + \alpha_L g_L(X, S, \Lambda_L) \quad (10)$$

where $\alpha_A$ and $\alpha_L$ are parameters of the combining model, $\Lambda_C$, $$g_\Lambda = \log f(X,\Theta_S,S|\Lambda_A), \quad g_L = \log P(W_1) + \sum_{\tau=2}^{n} \log P(W_\tau|W_{\tau-1}),$$

$\Lambda_L$ is a bigram-based language model, S is an ordered word string comprising $W_1, W_2, \ldots W_n$ ordered words, P(W) is a probability from the unigram language model and $P(W_\tau|W_{\tau-1})$ is a probability from a bigram language model.

String misrecognition measure processor 82 determines the value of a scalar, d, for use by the subsequent processors shown in FIG. 2.

2. String Model Loss Function Processor

String model loss function processor 84 evaluates a smooth string loss function, l, based on the scalar value $d(X,\Lambda)$ received from processor 82:

$$l(X,\Lambda) = \frac{1}{1 + e^{-\gamma(d(X,\Lambda)+d_0)}}, \quad (11)$$

where $\gamma$ is illustratively set to 1 and $d_o$ is a bias term illustratively set to zero.

Processor 84 provides scalar l as output to string model update processor 88.

Parameters $\gamma$ and $\eta$, (discussed above) help provide a smoothed approximation to the string loss function, l. The gradient of the string loss function (11) is used by the string model update processor 88 to update the model parameters, $\Lambda$. Therefore, minimization of the expected string loss of this loss function is directly linked to the minimization of the string error probability. Bias parameter $d_o$ may be used to enhance the effect of competing string models in the training process.

3. String Model Update Processor

Figure 3:
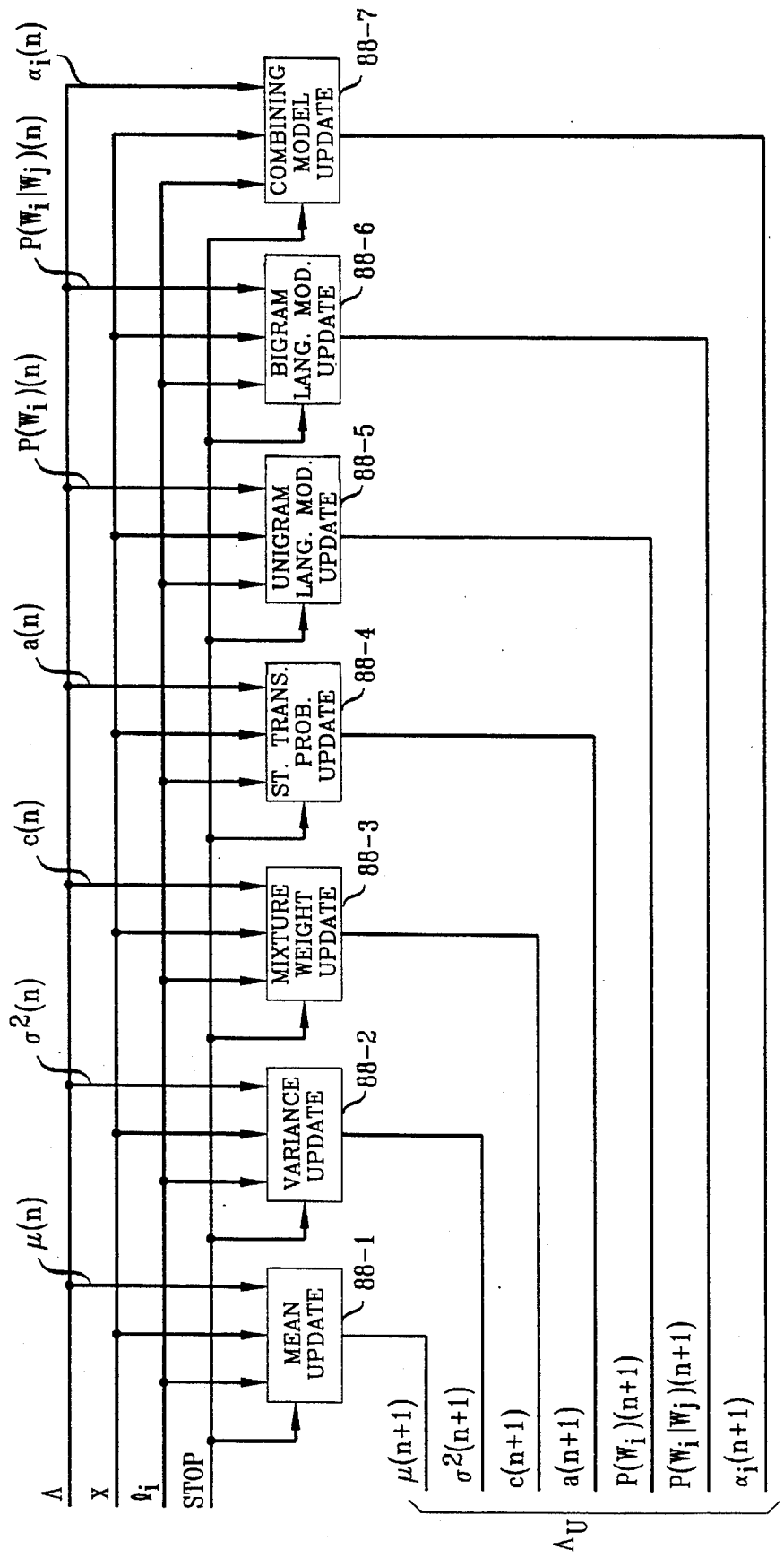
FIG. 3 presents an embodiment of string model update processor appearing in FIG. 2.

FIG. 3 presents an illustrative block diagram of the string model update processor 88. As shown in the Figure, processor 88 updates acoustic HMM parameters $\mu$, $\sigma^2$, c, and a; language model parameters $P(W_j)$ and $P(W_j|W_{j-1})$; and combining model parameters $\alpha_i$ based on $\Lambda$, X and l. Processor 88 and returns updated parameters $\Lambda_U$ to parameter data base 70. Both $\Lambda$ and $\Lambda_U$ comprise parameters $\mu$, $\sigma^2$, c, a, $P(W_j)$, $P(W_j|W_{j-1})$, and $\alpha_i$, with $\Lambda$ and $\Lambda_U$ representing unupdated and updated quantities respectively.

Prior to presenting a detailed discussion of model parameter updating by processor 88, some background to its operation will be presented.

The expected loss which is associated with the string error rate is given by $$L(\Lambda) = E_X[l(X,\Lambda)] \quad (12)$$

In minimum string error rate training, the goal is to minimize the expected loss (12) over the training samples. The expected loss (12) may be minimized by updated model parameters such that $$\Lambda_{n+1} = \Lambda_n - \epsilon_n U_n \nabla l(X,\Lambda), \quad (13)$$

where $\epsilon_n$ is a sequence of step size parameters and $U_n$ is a sequence of positive definite matrices defined below. The recursion represented by (13) will converge to a stationary point of the expected loss, provided that $\Sigma_{n=1}^\infty \epsilon_n = \infty$ and $\Sigma_{n=1}^\infty \epsilon_n^2 < \infty$.

In the illustrative embodiment of FIG. 2, the models, $\Lambda$, are adaptively adjusted according to (13) by update processor 88.

a. Acoustic Model Update

Due to the structure of acoustic HMMs, their parameters must satisfy certain constraints. String model update processor 88 employs transformed HMM parameters as part of the acoustic model parameter update process to satisfy all such constraints. The following transformations are used by processor 88:

(1) Logarithm of the variance $$\bar{\sigma}_{i,j,k,d}^2 = \log \sigma_{i,j,k,d}^2 \quad (14)$$

where $\sigma_{i,j,k,d}^2$ is the variance of the i-th recognition unit model, j-th state, k-th mixture component and d-th dimension of a feature vector, where each recognition unit model may reflect, e.g., a word or subword.

(2) Transformed logarithm of the mixture weights

The original mixture weights, $c_{i,j,k}$, are related to the transformed mixture weights $\bar{c}_{i,j,k}$ as follows:

$$c_{i,j,k} = \left( \frac{e^{\bar{c}_{i,j,k}}}{\sum_{l=1}^{L} e^{\bar{c}_{i,j,l}}} \right) \quad (15)$$

where L is the total number of the mixture weights in the j-th state in the i-th recognition unit model.

(3) Transformed logarithm of the transition probability

The original transition probabilities, $a_{i,j}$, are related to the transformed transition probabilities as follows:

$$a_{i,j} = \frac{e^{\bar{a}_{i,j}}}{\sum_{k=1}^{M} e^{\bar{a}_{i,k}}} \quad (16)$$

where M is total number of states in i-th recognition unit model.

A significant aspect of the illustrative embodiment concerns the handling of small variance. In some corrective training algorithms proposed in the past, variance adjustment is avoided, because if handled incorrectly, it can have an adverse effect.

Variances in HMMs can differ by as much as $10^4$ to $10^6$ times. These variances occur in the exponent part of the observation probability density function $b_j^i(x)$ and have a dominant effect on the likelihood score of HMMs. In the illustrative embodiment, this leads to a different sensitivity to HMM parameter adjustments, especially to the adjustment of mean parameters in the observation probability density function of HMMs.

In order to compensate for this vast difference in sensitivity, the embodiment employs a positive definite matrix $U_n$. The positive definite matrix $U_n$ is a diagonal matrix:

$$\text{diag}(\sigma_1^2(n), \ldots, \sigma_D^2(n)), \quad (17)$$

for each state, where $\sigma^2(n)$ is the variance of HMM $\Lambda_I$ at time n.

Regarding the update expressions themselves, each includes a term $\nabla l$ as described in (13) above. In general, $\nabla l$ takes the form $$\frac{\partial l}{\partial d(X,\Lambda)} \times \frac{\partial d(X,\Lambda)}{\partial \Lambda},$$

where $d(X,\Lambda)$ is defined in (8). The term $$\frac{\partial l}{\partial d(X,\Lambda)} = l_i(1 - l_i)$$

is common among the updates and is presented as a partial derivative. The term $$\frac{\partial d(X,\Lambda)}{\partial \Lambda}$$

is presented specifically for each model parameter being updated.

The acoustic model parameter updates provided by the update processor 88 are:

(4) Mean update $$\mu_{i,j,k,d}(n+1) = \mu_{i,j,k,d}(n) - \quad (18)$$

$$\epsilon_n \sum_{nn=\theta_j}^{\theta_{j+1}-1} \left( \frac{\partial l(X,\Lambda)}{\partial \log b_{i,j}(x_{nn})} \right) \gamma_{i,j,k}(x_{nn})(x_{nn}(d) - \mu_{i,j,k,d}(n)),$$

where $x_{nn}(d)$ is the d-th dimension component of the feature vector $x_{nn}$, $\theta_j$ corresponds to the time frame that the optimal path first enters the state j, $\theta_{j+1}$ corresponds to the time frame that the optimal path enters the state j+1, $l(X,\Lambda)$ is the loss function constructed according to (11), $\epsilon_n$ is the step size and $$\gamma_{i,j,k}(x_{nn}) = \left( c_{i,j,k}(2\pi)^{-D/2} \left( \prod_{d=1}^{D} \sigma_{i,j,k,d} \right)^{-1} \prod_{d=1}^{D} e^{-\frac{(x_{nn}(d)-\mu_{i,j,k,d})^2}{2\sigma_{i,j,k,d}^2}} \right) /b_{i,j}(x_{nn}), \quad (19)$$

where D is the dimension of the feature vector. The mean update is provided by block 88-1 of FIG. 3.

(5) Variance update

Updating of $\bar{\sigma}^2 = \log \sigma^2$ is performed according to the following formula:

$$\bar{\sigma}_{i,j,k,d}^2(n+1) = \bar{\sigma}_{i,j,k,d}^2(n) - \epsilon_n \sum_{nn=\theta_j}^{\theta_{j+1}-1} \left( \frac{\partial l(X,\Lambda)}{\partial \log b_{i,j}(x_{nn})} \right) \gamma_{i,j,k}(x_{nn}) \left( \frac{(x_{nn}(d)-\mu_{i,j,k,d})^2}{\sigma_{i,j,k,d}^2(n)} - 0.5 \right), \quad (20)$$

where $\gamma_{i,j,k}(x_{nn})$ is defined as in (19). Therefore, the variance at time n+1 is given by $$\sigma_{i,j,k,d}^2(n+1) = e^{\bar{\sigma}_{i,j,k,d}^2(n+1)}. \quad (21)$$

Variance is clipped below at $10^{-6}$ and it satisfies the constraint of $\sigma_{i,j,k,d}^2(n) > 10^{-6}$. The variance update is provided by block 88-2 of FIG. 3.

(6) Mixture weights update

The parametrized mixture weights are adjusted according to $$c_{i,j,k}(n+1) = \bar{c}_{i,j,k}(n) - \quad (22)$$

$$\epsilon_n \sum_{nn=\theta_j}^{\theta_{j+1}-1} \left( \frac{\partial l(X,\Lambda)}{\partial \log b_{i,j}(x_{nn})} \right) \frac{c_{i,j,k}(n)}{b_{i,j}(x_{nn})} [N(x_{nn}, \mu_{i,j,k,d}, V_{i,j,k,d}) - b_{i,j}(x_{nn})].$$

Therefore, the mixture weights at time n+1 is given by $$c_{i,j,k}(n+1) = \frac{e^{\bar{c}_{i,j,k}(n+1)}}{\sum_{l=1}^{L} e^{\bar{c}_{i,j,l}(n+1)}}. \quad (23)$$

Thus, the adjusted mixture weights meet the constraints of $\Sigma_k c_{i,j,k}(n) = 1$ and $c_{i,j,k}(n) > 0$ during training process. The mixture weights update is provided by block 88-3 of FIG. 3.

(7) State transition probability update:

In a left-to-right HMM, the parametrized transition probability of the l-th word model is adjusted by:

$$\begin{cases} \bar{a}_{i,i}^l(n+1) = \bar{a}_{i,i}^l(n) - \epsilon_n \frac{\partial l(X,\Lambda)}{\partial g_l} \left( N_{i,i}^l - (N_{i,i}^l + 1) \frac{e^{\bar{a}_{i,i}^l(n)}}{e^{\bar{a}_{i,i}^l(n)} + e^{\bar{a}_{i,i+1}^l(n)}} \right) \\ \bar{a}_{i,i+1}^l(n+1) = \bar{a}_{i,i+1}^l(n) - \epsilon_n \frac{\partial l(X,\Lambda)}{\partial g_l} \left( 1 - (1 + N_{i,i}^l) \frac{e^{\bar{a}_{i,i+1}^l(n)}}{e^{\bar{a}_{i,i}^l(n)} + e^{\bar{a}_{i,i+1}^l(n)}} \right) \end{cases} \quad (24)$$

where $g_l$ is the likelihood score of X in the l-th recognition unit model, i is not the end state and the total number of self-transition inside state i is denoted by $$N_{i,i}^l = \{\# \text{ of } t|(\theta_{t-1}, \theta_t) = (i,i) \text{ in l-th recognition unit model } \lambda_l\} \quad (25)$$

Consequently, the transition probability at time (n+1) is given by $$\begin{cases} a_{i,i}^l(n+1) = \frac{e^{\bar{a}_{i,i}^l(n+1)}}{e^{\bar{a}_{i,i}^l(n+1)} + e^{\bar{a}_{i,i+1}^l(n+1)}} \\ a_{i,i+1}^l(n+1) = \frac{e^{\bar{a}_{i,i+1}^l(n+1)}}{e^{\bar{a}_{i,i}^l(n+1)} + e^{\bar{a}_{i,i+1}^l(n+1)}} \end{cases} \quad (26)$$

which also satisfies the constraints of $\Sigma_j a_{i,j}^l(n) = 1, a_{i,i}^l > 0$ and $a_{i,i+1}^l > 0$. The state transition probability update is provided by block 88-4 of FIG. 3.

Update expressions (20–23) computed by update processor 88 relate to an updated observation probability density function of the i-th acoustic HMM recognition unit model, in the j-th state according to:

$$b_{i,j}(x) = \sum_{k=1}^{M} c_{i,j,k} N(x, \mu_{i,j,k}, V_{i,j,k}) \quad (27)$$

where $c_{i,j,k}$ is the mixture weights and $N(x, \mu_{i,j,k}, V_{i,j,k})$ is a D-dimensional normal Gaussian distribution for the i-th recognition unit model, j-th state and k-th mixture with a diagonal covariance matrix $V_{i,j,k}$.

b. Language Model Update

For language models, like acoustic models, the update occurs in the transform domain. For example, the following transforms may be used by processor 88:

(1) Transform of probability from unigram language model $$P(W_i) = \left[ \frac{e^{\overline{P}(W_i)}}{\sum_{j=1}^{N} e^{\overline{P}(W_j)}} \right], \quad (28)$$

where N is the total number of words and $\overline{P}(W_i) = \log P(W_i)$.

(2) Transform of a probability from bigram language model $$P(W_i|W_j) = \left[ \frac{e^{\overline{P}(W_i|W_j)}}{\sum_{k=1}^{N} e^{\overline{P}(W_i|W_k)}} \right], \quad (29)$$

where N is the total number of words and $\overline{P}(W_i|W_j) = \log P(W_i|W_j)$.

The language model parameter updates performed by processor 88 are done as follows.

Let $S_{lex} = W_1^l \ldots W_{r_l}^l, S_1 = W_1^1 \ldots W_{n_1}^1, \ldots, S_k = W_1^k, \ldots, W_{n_k}^k$ be the word strings in misrecognition measure (8), where $S_{lex}$ is the lexical (or correct) word string and $S_i$ (i=1, ..., N) are N competing word strings determined by N-best decoding (75).

(3) Unigram language model probability update:

$$\overline{P}(W_i)(n+1) = \overline{P}(W_i)(n) - \epsilon_n \frac{\partial l(X, \Lambda)}{\partial \overline{P}(W_i)} = \quad (30)$$

$$\overline{P}(W_i)(n) - \gamma \epsilon_n l(1-l) \frac{\partial g(X, S_{lex}, \Lambda)}{\partial \overline{P}(W_i)} -$$

$$\frac{\partial \log \left[ \frac{1}{N-1} \sum_{S_k \neq S_{lex}} e^{g(X, S_k, \Lambda)} \right]^{\frac{1}{\eta}}}{\partial \overline{P}(W_i)} =$$

$$\overline{P}(W_i)(n) - \gamma \epsilon_n l(1-l) \left[ \frac{\partial g(X, S_{lex}, \Lambda)}{\partial P_L(S_{lex})} \frac{\partial P_L(S_{lex})}{\partial \overline{P}(W_i)} - \right.$$

$$\left. \sum_{k:S_k \neq S_{lex}} \left( \frac{\partial \log \left[ \frac{1}{N-1} \sum_{S_k \neq S_{lex}} e^{g(X, S_k, \Lambda)} \right]^{\frac{1}{\eta}}}{\partial P_L(S_k)} \cdot \frac{\partial P_L(S_k)}{\partial \overline{P}(W_i)} \right) \right].$$

The unigram probability update is provided by block 88-5 of FIG. 3.

(4) Bigram language model probability update:

$$\overline{P}(W_i|W_j)(n+1) = \overline{P}(W_i|W_j)(N) - \epsilon_n \frac{\partial l(X, \Lambda)}{\partial \overline{P}(W_i|W_j)} = \quad (31)$$

$$\overline{P}(W_i|W_j) - \gamma \epsilon_n l(1-l) \left[ \frac{\partial g(X, S_{lex}, \Lambda)}{\partial P_L(S_{lex})} \frac{\partial P_L(S_{lex})}{\partial \overline{P}(W_i|W_j)} - \right.$$

$$\left. \sum_{k:S_k \neq S_{lex}} \frac{\partial \log \left[ \frac{1}{N-1} \sum_{S_k \neq S_{lex}} e^{g(X, S_k, \Lambda)} \right]^{\frac{1}{\eta}}}{\partial P_L(S_k)} \frac{\partial P_L(S_k)}{\partial \overline{P}(W_i|W_j)} \right].$$

The bigram probability update is provided by block 88-6 of FIG. 3.

c. Combining Model Parameter Update

For the combining model parameters, where string model $$g(X, S, \Lambda) = \sum_{i=1}^{m} \alpha_i g_i(X, S, \Lambda_i),$$

the update is performed as follows:

$$\alpha_i(n+1) = \alpha_i(n) - \epsilon_n \frac{\partial l(X, \Lambda)}{\partial \alpha_i} = \alpha_i(n) - \epsilon_n \gamma l(1-l) \left[ g(X, S_{lex}, \Lambda_i) - \right.$$

$$\left. \sum_{k:S_k \neq S_{lex}} \frac{\partial \log \left[ \frac{1}{N-1} \sum_{S_k \neq S_{lex}} e^{g(X, S_k, \Lambda)} \right]^{\frac{1}{\eta}}}{\partial g_i(X, S_k, \Lambda_i)} \right].$$

The combining model parameter update is provided by block 88-7 of FIG. 3.

Values for $\mu(n+1)$, $\sigma^2(n+1)$, $c(n+1)$, $a(n+1)$, $P(W_i)(n+1)$, $P(W_i|W_j)(n+1)$, and $\alpha_i(n+1)$ are output from blocks 88-1 through 88-7. As shown in FIG. 3, $\Lambda_U$ comprises updated values for $\mu$, $\sigma^2$, c, a $P(W_i)$, $P(W_i|W_j)$, and $\alpha_i$.

Expressions for parameter updating provided above concern the use of a single speech training string sample from database 70 to enchance model parameters. Enhanced trainer 80 may iterate a plurality of times, however, to improve the model parameters. For example, the enhanced trainer 80 may operate on all training string samples in database 70. However, if desired, trainer 80 may operate on several passes or rounds through the complete database 70. Trainer 80 may be made to stop processing samples in any of several ways. For example, the trainer 80 may stop when it has made a fixed number of rounds through the database 70 of samples. It is preferred, however, that trainer 80 maintain a record of the incremental improvement in string error rate due to processing all speech training strings of the current round.

C. Discussion

While the acoustic models of the illustrative embodiment specifically concerns HMMs, the present invention is applicable to recognizers employing other types of acoustic models, such as, e.g., a template-based acoustic recognizers employing dynamic time warping as the method of scoring. In order to adapt the present invention to other types of recognizers, the method of scoring, represented as function g in (8), must be changed to reflect the recognizer type. This change would also be reflected in the recognition unit model update process in terms of $\nabla 1$.

In the embodiment described above, each sample string of training speech is used sequentially. The string model update processor 88 takes the information provided by the recognizer on the current sample string and updates model parameters according to the updating formulae provided above. The computational complexity of processor 88 depends mainly on the form of the misrecognition measure which determines how many competing candidate string models will be used for model parameter estimation.

As described above, each iteration of the enhanced trainer 80 operates on a single speech training sample. However, it is possible for the trainer to provide an updated set of model parameters, $\Lambda_U$, based on a plurality of samples. To do this, the string misrecognition measure processor 82 operates on a vector of speech string samples to yield a vector of values for d, where each value corresponds to a given string sample. String model loss function processor 84 receives the vector of d values and yields a vector of l values, each based on a corresponding value of d. string model update processor 88 updates parameters as described above, where each update $\Lambda(n)$ to $\Lambda(n+1)$ is provided by a single speech string sample (of the N string samples). However, all string samples are used in succession such that $\Lambda(n+1)$ resulting from processing one sample serves as $\Lambda(n)$ for processing a subsequent sample. Note that in updating $\Lambda$ based on multiple string samples, the value of $\Lambda$ on the right side of (18, 20, 22, 24, 30, 31 and 32) remains constant. Only after all string samples have been processed is $\Lambda_I$ updated to the database as $\Lambda_U$.

Note that the loss function presented in (11) is but one type of function applicable to the present invention. Other types of functions, such as that based on the hyperbolic tangent, are also applicable, i.e., $l(d(X,\Lambda))=\tanh(\gamma d(X,\Lambda))$.

The process described generally by (13), and specifically by (18, 20, 22, 24, 30, 31 and 32), provides for the identification of a local minimum of the string loss function. However, conventional techniques for finding the global minimum of the loss function, such as simulated annealing, may be applied.

In light of the above, it will be apparent to one of ordinary skill in the art that the present invention is applicable to both speaker-dependent and speaker-independent speech recognition.

In addition, although the illustrative embodiment of the present invention concerns string models linearly combining acoustic and language models, it will be apparent to one of ordinary skill in the art that the present invention is applicable to string models incorporating other/additional knowledge sources and model types such as semantic models, phonetic models, syntactic models, etc., as well as other combining models, including nonlinear combining models.

We claim:

1. A method of making a speech recognition model database based on a training speech utterance signal and a plurality of sets of current speech recognition models, the method comprising the steps of:
   a. generating a set of one or more confusable string models, a confusable string model comprising a plurality of said current speech recognition models from two or more of said sets of said current speech recognition models, wherein each of at least two of said sets of models corresponds to different characteristics of speech and wherein the confusable string model is a model which, if selected to represent the training speech utterance, would result in a misrecognition of the training speech utterance;
   b. generating a first scoring signal based on the training speech utterance signal and a string model for that utterance, the string model for the utterance comprising a plurality of said current speech recognition models from said two or more of said sets of said current speech recognition models;
   c. generating one or more second scoring signals, a second scoring signal based on the training speech utterance signal and a confusable string model;
   d. generating a signal reflecting a comparison of a likelihood of correctly recognizing the training speech utterance and a likelihood of incorrectly recognizing the training speech utterance, said likelihood of correctly recognizing the training speech utterance based on the first scoring signal and said likelihood of incorrectly recognizing the training speech utterance based on the one or more second scoring signals; and
   e. based on the signal reflecting the comparison of said likelihoods, modifying one or more of said current speech recognition models to increase the probability that a string model for the utterance will have a rank order higher than the confusable string models.

2. The method of claim 1 wherein the step of generating the set of one or more confusable string models comprises generating N-best word string models.

3. The method of claim 1 wherein the first scoring signal reflects a measure of similarity between the training speech utterance signal and the string model for that utterance.

4. The method of claim 3 wherein the measure of similarity comprises a log-likelihood recognizer score.

5. The method of claim 1 wherein the second scoring signal reflects a measure of similarity between the training speech utterance signal and one of said confusable string models.

6. The method of claim 5 wherein the measure of similarity comprises a log-likelihood recognizer score.

7. The method of claim 1 wherein the step of generating a signal reflecting a comparison comprises forming a difference of the first scoring signal and a combination of the one or more second scoring signals.

8. The method of claim 1 wherein the step of modifying the one or more of said current speech recognition models comprises the steps of:
   1. generating a recognition model modification signal reflecting a gradient of a function, the function reflecting a recognizer score of a training speech utterance based on a string model for that utterance and one or more recognizer scores of the training speech utterance based on the one or more confusable string models; and
   2. adapting the one or more of said current speech recognition models based on the modification signal.

9. The method of claim 8 wherein the function reflects a difference of a recognizer score of a training speech utterance based on a string model for that utterance and a weighted sum of the one or more recognizer scores of the training speech utterance based on one or more confusable string models.

10. The method of claim 1 wherein one of said sets of current speech recognition models comprises acoustic models.

11. The method of claim 10 wherein the acoustic models comprise hidden Markov models.

12. The method of claim 1 wherein one of said sets of current speech recognition models comprises language models.

13. The method of claim 1 wherein one of said sets of current speech recognition models comprises pitch models.

14. The method of claim 1 wherein one of said sets of current speech recognition models comprises energy models.

15. The method of claim 1 wherein one of said sets of current speech recognition models comprises speaking rate models.

16. The method of claim 1 wherein one of said sets of current speech recognition models comprises duration models.

17. A speech recognizer trainer for making a speech recognition model database based on a training speech utterance signal and a plurality of sets of current speech recognition models, the trainer comprising a. means for generating a set of one or more confusable string models, a confusable string model comprising a plurality of said current speech recognition models from two or more of said sets of said current speech recognition models, wherein each of at least two of said sets of models corresponds to different characteristics of speech and wherein the Confusable string model is a model which, if selected to represent the training speech utterance, would result in a misrecognition of the training speech utterance;

b. means for generating a first scoring signal based on the speech utterance signal and a string model for that utterance, the string model for the utterance comprising a plurality of said current speech recognition models from said two or more of said sets of said current speech recognition models;

c. means for generating one or more second scoring signals, a second scoring signal based on the training speech utterance signal and a confusable string model;

d. means for generating a signal reflecting a comparison of a likelihood of correctly recognizing the training speech utterance and a likelihood of incorrectly recognizing the training speech utterance, said likelihood of correctly recognizing the training speech utterance based on the first scoring signal and said likelihood of incorrectly recognizing the training speech utterance based on the one or more second scoring signals; and e. means, responsive to the signal reflecting the comparison of said likelihoods, for modifying one or more of said current speech recognition models to increase the probability that a string model for the utterance will have a rank order higher than the confusable string models.

18. The trainer of claim 17 wherein the means for generating a signal reflecting a comparison comprises means for forming a difference between the first scoring signal and a combination of the one or more second scoring signals.

19. The trainer of claim 17 wherein the means for modifying the one or more of said current speech recognition models comprises:

1. means for generating a recognition model modification signal reflecting a gradient of a function, the function reflecting a recognizer score of a training speech utterance based on a string model for that utterance and one or more recognizer scores of the training speech utterance based on the one or more confusable string models; and 2. means for adapting the one or more of said current speech recognition models based on the modification signal.

20. A speech recognition system comprising:

a. a feature extractor for receiving an unknown speech signal and generating feature signals characterizing the unknown speech signal;

b. a memory for storing a plurality of sets of speech recognition models, one or more of the speech recognition models generated in accordance with a process of modifying parameters of predetermined speech recognition models to enhance the probability that a correct string model will have a rank order higher than one or more confusable string models, wherein each of at least two of said sets of speech recognition models corresponds to different characteristics of speech and wherein said confusable string models are models which, if selected to represent a training speech utterance, would result in a misrecognition of the training speech utterance, and wherein the modification of said parameters is based on a comparison of a likelihood of correctly recognizing a training speech utterance and a likelihood of incorrectly recognizing the training speech utterance, the likelihood of correctly recognizing the training speech utterance based on a first scoring signal and the likelihood of incorrectly recognizing the training speech utterance based on one or more second scoring signals, the first scoring signal generated based on the training speech utterance and a string model for that utterance, the string model for the utterance comprising a plurality of said speech recognition models from said at least two of said sets of said speech recognition models, and each of the second scoring signals generated based on the training speech utterance signal and one of said confusable string models; and c. a scoring processor, coupled to the feature extractor and the memory, for comparing a string model with features of the unknown speech signal, the string model comprising one or more of said speech recognition models from each of the plurality of said sets of speech recognition models, and for recognizing the unknown speech signal based on one of a plurality of string models which most closely compares with the features of the unknown speech signal.

21. A method of making a speech recognition model database based on a training speech utterance signal, two or more sets of current speech recognition models, each of which sets representing a different characteristic of speech, and at least one confusable string model, said confusable string model comprising a plurality of said current speech recognition models from each of said sets of models and being a model which, if selected to represent the training speech utterance signal, would result in a misrecognition of said signal, the method comprising:

a. generating a first scoring signal based on the training speech utterance signal and a string model for that utterance, the string model for the utterance comprising a plurality of said current speech recognition models from said two or more of said sets of current speech recognition models;

b. generating one or more second scoring signals, a second scoring signal based on the training speech utterance signal and a confusable string model;

c. generating a signal reflecting a comparison of a likelihood of correctly recognizing the training speech utterance and a likelihood of incorrectly recognizing the training speech utterance, said likelihood of correctly recognizing the training speech utterance based on the first scoring signal and said likelihood of incorrectly recognizing the training speech utterance based on the one or more second scoring signals; and d. based on the signal reflecting the comparison of said likelihoods, modifying one or more of said current speech recognition models to increase the probability that a string model for that utterance will have a rank order higher than the confusable string models.

\* \* \* \* \*